United States Patent [19]

Rohrbach et al.

[11] Patent Number: 5,098,793
[45] Date of Patent: Mar. 24, 1992

[54] CYCLODEXTRIN FILMS ON SOLID SUBSTRATES

[75] Inventors: Ronald P. Rohrbach, Des Plaines; Haya Zemel, Wilmette; Mark B. Koch, Mt. Prospect, all of Ill.

[73] Assignee: UOP, Des Plaines, Ill.

[21] Appl. No.: 498,197

[22] Filed: Mar. 23, 1990

Related U.S. Application Data

[63] Continuation-in-part of Ser. No. 250,676, Sep. 29, 1988, abandoned.

[51] Int. Cl.⁵ .................. C08B 37/02; C07H 1/00; B32B 23/04; B32B 23/06
[52] U.S. Cl. .................. 428/532; 536/103; 527/300; 527/311; 8/115.6; 428/402; 428/403; 428/426; 428/457
[58] Field of Search ............... 536/103; 527/300, 311; 424/450; 428/402, 403, 532, 426, 457; 8/115.6

[56] References Cited

U.S. PATENT DOCUMENTS

| | | | |
|---|---|---|---|
| 4,902,788 | 2/1990 | Zemel et al. | 536/103 |
| 4,917,956 | 4/1990 | Rohrbach | 428/423.1 |
| 4,921,705 | 5/1990 | Arai et al. | 428/402 |
| 4,958,015 | 9/1990 | Zemel et al. | 536/103 |

Primary Examiner—Ronald W. Griffin
Attorney, Agent, or Firm—Thomas K. McBride; Eugene I. Snyder

[57] ABSTRACT

A large class of crosslinked cyclodextrin resins soluble in water to an extent under about 200 ppm but soluble in an organic solvent to an extent of at least 0.1 weight percent have good film-forming properties with a wide variety of solid phase substrates. The films exhibit excellent adhesive properties toward virtually all solid surfaces which consequently can be readily coated with a thin film having a multiplicity of cyclodextrin moieties available at the surface for seperation and/or purification. Such coated substrates can be prepared in a variety of sizes, shapes, and cyclodextrin loading quite conveniently and relatively inexpensively.

20 Claims, No Drawings

CYCLODEXTRIN FILMS ON SOLID SUBSTRATES

CROSS-REFERENCE TO RELATED APPLICATIONS

This application is a continuation-in-part of our copending application, Ser. No. 250,676, filed Sept. 29, 1988, and now abandoned, all of which is hereby incorporated by reference.

BACKGROUND OF THE INVENTION

Cyclodextrins are cyclic molecules consisting of 1-4 linked alpha-D-glucopyranose monomeric units. The cyclodextrins containing 6-, 7-, and 8-glucose units joined to form a ring, commonly known as alpha-, beta-, and gamma-cyclodextrin, respectively, are the most important cyclodextrins to date, possibly because of their availability relative to cyclodextrins of different ring size. The usefulness of these cyclodextrins arises from their ability to reversibly form inclusion complexes, or clathrates, with many types of compounds. Inclusion complexes arise when a host molecule, such as a cyclodextrin, has a structure containing an interior cavity into which guest molecules can bind by weak interactions such as van der Waal's forces. The latter are short range forces which are sufficiently strong to allow the formation of definite, generally solid complexes, but are sufficiently weak to permit ready dissociation of the complex to a host and guest molecule.

The cyclodextrins are doughnut-shaped molecules with an interior cavity whose size and shape are determined by the number of glucose units that make up the ring. In alpha-cyclodextrin the almost cylindrical cavity is approximately 7 angstroms deep and 5 angstroms in diameter. In beta-cyclodextrin the depth is the same but the diameter is 7 angstroms, and in gamma-cyclodextrin the cavity is again 7 angstroms deep but is 9 angstroms in diameter. Cyclodextrins are soluble in water because of the many hydroxyl groups of the glucose subunits that surround the rim of the cavity. However, the interior of the cavities is hydrophobic, and it is these hydrophobic cavities which lead to extraction of organic molecules from aqueous solution if the organic materials have the correct shape and hydrophobic character.

The complexing ability of cyclodextrins lends itself to various uses. For example, the cyclodextrins are used in encapsulating desirable flavors and fragrances which can then be stored for reasonably long periods of time and added to foods at their preparation. Reciprocally, cyclodextrins may be used in removing undesirable flavors and fragrances from food by complexing with them. Cyclodextrins also are used in the protection of foods against oxidation, photochemical degradation, and thermal decomposition. These and other uses have been summarized by J. Szejtli, Starch, 34, 379-385 (1982)

Although in some applications the use of the water soluble cyclodextrins themselves is appropriate, in other cases it is desirable to employ an insolubilized cyclodextrin to more readily enable its extended use or to enable its incorporation in a continuous process. For example, when cyclodextrins are employed for their ability to separate various components, as in gas phase chromatography or high pressure liquid chromatography, the water soluble cyclodextrins have obvious limitations and some sort of solid phase incorporating the cyclodextrins is needed. Another example is the use of cyclodextrins to remove bitter components in citrus juice where it is desired to pass the juice over a solid bed incorporating cyclodextrins to give an effluent of reduced bitterness.

These needs previously have been recognized, and one general solution is the preparation of polymeric cyclodextrin derivatives as resins which can be used per se as a solid support in chromatographic applications or as a fixed bed in continuous processes. Buckler et al. in U.S. Pat. No. 3,472,835 recognized the need for insolubilized cyclodextrins as "molecular sieves" in separation and purification processes and offered as a general solution insoluble resins prepared from the reaction of cyclodextrins with compounds having at least two hydroxyl-reactive functional groups per molecule. The patentee disclosed a large class of suitable polyfunctional compounds, including isocyanates, and exemplified several insoluble polymeric cyclodextrin derivatives suitable for use in numerous described applications.

More recently Mizobuchi prepared and tested cyclodextrin polyurethane resins as gas phase chromatographic columns (J. Chromatography, 194, 153 (1980); ibid., 208, 35 (1981)) in the separation of numerous classes of materials, including aromatic amino acids, and as sorbents for low molecular weight organic vapors (Bull. Chem. Soc. Jpn, 54, 2487 (1981)) and aromatic compounds in water (ibid., 55, 2611 (1982)). The resins generally were prepared by reacting at 80°-115° C. a cyclodextrin with from about 3.5 to about 12.6 molar proportions of a diisocyanate in pyridine or dimethylformamide as a solvent, then precipitating the formed resin with a large excess of methanol or acetone. In some cases the unreacted hydroxyl groups in the resins were then silanized. The isocyanates used were hexamethylene diisocyanate, 1,3-bis(isocyanatomethyl)cyclodexane, and 1,3-bis(isocyanatomethyl)benzene.

As useful as are the polymeric resins themselves as the solid adsorbent, they have limitations arising from porosity and transport characteristics. That is, the size and number of the channels in the solid resins limit transport of species in solution to available cyclodextrin sites and consequently restrict the efficiency of separation. It was reasoned that such transport limitations would be appreciably relaxed, if not removed, if the cyclodextrin polymer was presented as a thin film. The problem to be addressed then is the preparation of thin films of cyclodextrins. However, not just any thin film will suffice; both the method of preparing these thin films and the properties of the films themselves must meet several criteria for optimal film usage as we envisage it. A thin film of cyclodextrin polymers should be able to be formed on virtually any surface. The method of forming the thin film should be convenient, facile, inexpensive, and universal-that is, the same method should be applicable regardless of the nature of the surface. The resulting film should be insoluble in water and in most organic solvents other than dipolar aprotic solvents so that it is retained under process conditions. The film also should be tough, abrasion-resistant, and tenacious so that it continues to function effectively in, e.g., a fixed bed environment of high, turbulent fluid flow.

The problem is simply stated; its solution is our invention. More particularly, we have found a class of lightly crosslinked cyclodextrins with a solubility in water under about 200 ppm and with a solubility in an organic solvent to the extent of at least 0.1 weight percent. This differential solubility of the lightly crosslinked cyclodextrin enables thin films to be cast on a surface and is an indispensable feature of, and a key to, our invention. These crosslinked cyclodextrins share the property of forming a film with good adhesion to virtually any solid phase substrate, with the film being resistant to peeling and abrasion when the coated substrate is used as a fixed bed in, for example, separation processes. The lightly crosslinked cyclodextrins of our invention also share the property of forming inclusion complexes to an extent similar to the non-crosslinked cyclodextrin, and the films are relatively simple to prepare using commonly available materials. Among the lightly crosslinked cyclodextrins we have examined, polyurethane cyclodextrins have desirable features from other aspects, which led us to develop a method for making coatings of cyclodextrins crosslinked with polyfunctional isocyanates. The method is extraordinarily versatile, almost approaching universality, and can be used to coat materials as diverse as ceramics, fabrics, metals, paper, wood, and glass.

The cyclodextrin resins of Buckler et al., or "insolubilized cyclic dextrins" as the patentees refer to them, appear to be highly crosslinked cyclodextrins with low water solubility and, judging from the examples, low solubility in organic solvents. Certainly it can be said that the patentees have no appreciation of the differential solubility characteristics of the lightly crosslinked cyclodextrins of our invention, nor is their any contemplation of the important film-forming properties associated with this differential solubility. The patentees of U.S. Pat. No. 3,477,802 teach modifying polymeric materials having active hydrogen atoms, such as naturally occurring polysaccharides, with saturated beta oxyethyl derivatives of activated olefin compounds containing at least one activating group in a position beta to an ether or a hydroxyl oxygen. Such modification by a monofunctional reagent does not afford a lightly crosslinked polymer, and does not appear relevant.

Wimmer, U.S. Pat. No. 2,910,467, teaches that starch crosslinked with hexahydro-1,3,5-triacryloyl-s-triazine affords an improved adhesive of increased water resistance. Smith et al. disclose lightly crosslinking starch adhesive compositions with polyfunctional reagents to increase the resistance of such adhesives to loss of viscosity produced by pumping, stirring, etc.; U.S. Pat. No. 3,004,855. The patentees of U.S. Pat. No. 4,438,262 teach that the cyanoethylation product of dihydroxypropylated polysaccharides are high dielectric compounds with superior adhesiveness. Among various applications of use are mentioned film, sheet, coating film and plasticizer, and the patentees make mention of utilizing their dielectric properties by forming a thin film for electroluminescent panels.

From this review of the prior art applicants believe that coatings from cyclodextrins appear not to have been fairly taught. In particular, coatings from cyclodextrins lightly crosslinked by the polyfunctional reagents of this invention and having the differential solubility characteristics, described within, necessary for the success of our invention have not previously been alluded to. Even more important is the fact the coatings of our invention result from only a narrow window of resin-forming conditions nowhere taught or contemplated, with the possibility of coating materials according to our invention never even recognized.

SUMMARY OF THE INVENTION

The purpose of this invention is to coat articles with a polymeric cyclodextrin suitable for use, for example, in separation and purification processes where an insolubilized cyclodextrin is needed. A general embodiment is a coating of a lightly crosslinked cyclodextrin having a water solubility less than about 200 ppm at 25° C. and a solubility more than about 0.1 weight percent in an organic solvent. In a specific embodiment the cyclodextrin is crosslinked with a polyfunctional agent. In a more specific embodiment the polyfunctional agent is an activated dicarboxylic acid. In a still more specific embodiment the dicarboxylic acid is succinic, glutaric, or adipic acid. In another specific embodiment the crosslinking agent is divinylsulfone. Another purpose of our invention is to form a film of a polymeric cyclodextrin on a solid phase surface where the cyclodextrin already has included guest molecules. Other purposes and embodiments will be apparent from the ensuing description.

DETAILED DESCRIPTION OF THE INVENTION

Our invention is based on several key discoveries. One is that in the reaction of cyclodextrins with a large class of polyfunctional agents the solubility characteristics of the crosslinked reaction product vary with the molar ratio of polyfunctional agent to cyclodextrin. In particular, at low values of this ratio the crosslinked product is soluble in both water and the organic solvent in which the homogeneous reaction is conducted. As this ratio increases, i.e., as the product becomes more highly crosslinked, the product becomes insoluble in water while maintaining its solubility in some organic solvents. With still further increases in the ratio the product becomes insoluble in organic solvents as well as water. What is important is that there exists a window, often a narrow one, where the crosslinked cyclodextrin is insoluble in water but soluble in the organic solvent used. For the purposes of this invention, a suitable crosslinked cyclodextrin resin has a water solubility at 25° C. of less than 200 ppm, but has a solubility at 25° C. in a dipolar aprotic solvent of at least 0.1 weight percent.

The second important observation is that the crosslinked cyclodextrin arising from reaction with a large class of polyfunctional agents and formed in the aforementioned "window" adheres readily to virtually any surface, thereby providing a thin film of uniform thickness of a cyclodextrin-containing polymer. A consequence of this is that such a crosslinked cyclodextrin resin may be deposited on any surface and may be almost literally painted onto the surface. Consequently such a coated surface is easy to prepare with a uniform film thickness. The coatings have good adhesive qualities and chemisorption is unnecessary for its binding. Such coated surfaces have several distinctions from the more highly crosslinked discrete particles of the resins themselves. One distinction is the simplicity of the film and its preparation, both of which lead to substantial reduction in cost and time of preparation in contrast to the use of the resin when, for example, a coated substrate is used in separations. Another advantage is that a coated substrate may be prepared from a virtually unlimited number and nature of solid phases in a variety of forms and shapes. Still another advantage is that coated surfaces can be prepared with a uniform thickness of cyclodextrin resins. Yet another important advantage is that if, for whatever reason, the coated cyclodextrin is deactivated it can be readily stripped or removed and the substrate can be reused, a characteristic particularly important where the substrate is relatively expensive.

Although throughout this application we shall describe our invention in terms of a film of a lightly crosslinked cyclodextrin per se, it is important to appreciate and understand that the film can equally as well be one of a cyclodextrin having a guest molecule already included within its inclusion-forming interior cavities. Thus, our invention may be used not only to form a film of a lightly crosslinked cyclodextrin which can subsequently form inclusion complexes with suitable guest molecules, but it also may be used to form a film of a lightly crosslinked cyclodextrin which has already formed an inclusion complex. In this latter case the film contains a guest molecule, usually with certain properties specifically desirable for the contemplated end use.

The substrate which is coated in this invention can be virtually any solid phase material. Both hydrophilic and hydrophobic surfaces may be coated, and solids of any shape or size may be utilized. The porosity of the surface is not material as regards its ability to be used in the practice of this invention, although other considerations may dictate sometimes a porous and sometimes a nonporous solid. Because of the excellent adhesive properties of the resin a virtually unlimited range of solid substrates can be used, as for example ceramics, glass, plastics, metals, fabrics, and cellulosic products. A class of substrates having particularly desirable properties for use in fixed beds are refractory inorganic oxides, and especially porous inorganic oxides, such as alumina, titania, silica, magnesia, boria, thoria, zirconia, and combinations thereof. Both alumina and silica are especially favored. Among the cellulosics paper, wood, and other wood fabrics are readily used as substrates in the practice of this invention. For example, paper can be coated with the resins of this invention for subsequent use in thin layer chromatography. But it needs to be emphasized that because of the excellent film-forming and film-maintaining characteristics of our materials, the solid phase substrate is not in any way limiting to our invention and is largely a matter of choice.

The substrate is coated with a film of a crosslinked cyclodextrin where the film is the reaction product of a large class of polyfunctional agents with a cyclodextrin having quite particular solubility characteristics in water and in an organic solvent. The members of the group of films of this invention share the common property of strongly adhering to the aforementioned surfaces.

The polyfunctional (or crosslinking) agent and cyclodextrin are reacted in relative amounts to afford a crosslinked resin soluble in the organic solvent, without any gel formation, while being insoluble in water. By "soluble" is meant a solubility at about 25° C. of at least 0.1 weight percent; by "insoluble in water" is meant a solubility at 25° C. less than about 200 ppm, and preferably under about 160 ppm. The relative amounts of polyfunctional agent and cyclodextrin will depend mainly on the particular crosslinking agent and cyclodextrin used, but nonetheless are readily determined through simple experimentation, as described in detail below. Briefly, to aliquots of a solution of cyclodextrin is added the polyfunctional agent in differing molar proportions until there forms a gel of the resin. The molar ratio at gel formation represents the upper limit of polyfunctional agent which can be used. Crosslinked resin is then isolated from reaction mixtures in which a lesser amount of polyfunctional agent was used and tested for water solubility. The molar ratio at which the resin has a water solubility greater than 200 ppm represents the lower limit of polyfunctional agent which can be used. It needs to be emphasized that the effective amount of polyfunctional agent needed to form a suitable product for use in this invention will vary with both the polyfunctional agent and cyclodextrin used, but nonetheless the operable range of ratios of crosslinking agent to cyclodextrin can be easily determined through routine experimentation.

In the context of this application a polyfunctional agent is one having at least two hydroxyl-reactive functional groups per molecule. The cyclodextrin films of this invention are the reaction product of a cyclodextrin and a polyfunctional agent with the film having the previously defined solubility characteristics. Since each cyclodextrin has a multiplicity of hydroxyl groups the reaction product is a complex mixture of products resulting from reaction of all the functional groups of the polyfunctional agent with some of the hydroxyl groups within a cyclodextrin molecule ("intramolecular" product) and products from the reaction of all the functional groups of the polyfunctional agent and some of the hydroxyl groups of different cyclodextrin molecules ("intermolecular" product). The intramolecular product may be thought of as an intramolecularly crosslinked cyclodextrin and the intermolecular product may be regarded as conventionally crosslinked material. It should be clear that the intermolecular product, or conventionally crosslinked, cyclodextrins are characterized by a large molecular weight increase whereas the intramolecularly crosslinked products have a much lower molecular weight increase. It is believed that the necessary solubility characteristics are determined primarily by intermolecularly crosslinked cyclodextrins.

One class of polyfunctional agent includes the polyisocyanates, and among these the diisocyanates are favored. A broad variety of polyisocyanates may be used in the practice of this invention and may be exemplified by such materials as the toluene diisocyanates, p- and m-phenylene diisocyanate, tetramethylene diisocyanate, 1,6-hexamethylene diisocyanate, 1,4-cyclohexylene diisocyanate, 4,4'-methylenedicyclohexyl diisocyanate, 4,4'-methylenediphenyl diisocyanate, 3,3'-dimethyl-4,4'-diphenylmethane diisocyanate, 1,5-tetrahydromethylene diisocyanate, dianisidine diisocyanate, bitolylene diisocyanate, naphthalene-1,4-diisocyanate, bis(2-methyl-3-isocyanatophenyl)methane, bis(3-methyl-4-isocyanatophenyl)methane, 4,4'-diphenylpropane diisocyanate, and the methylene-bridged polyphenyl polyisocyanates such as are described and discussed in U.S. Pat. No. 4,433,067, especially the polyisocyanates based on methylenediphenyl diisocyanates and the uretonimine modified MDI as described therein. It is to be emphasized that the foregoing polyisocyanates are merely illustrative of those which can be used in the practice of this invention. Among the polyisocyanates the use of the toluene diisocyanates (TDI) and methylenediphenyl diisocyanate (MDI) are particularly preferred.

A second class of polyfunctional agents consists of activated polycarboxylic acids. What is meant by activated polycarboxylic acids are derivatives of carboxylic acids each of whose carboxyl groups is reactive toward, and reacts with, hydroxyl groups of cyclodextrins.

Chief among the activated polycarboxylic acids are the polycarboxylic acid polyhalides, that is, polycarboxylic acids each of whose carboxyl groups is in the form of an acid halide. Dicarboxylic acid dihalides are the most important representatives of this class of polyfunctional agents, and chief among them are those dihalides having as their parent a linear alkane dicarboxylic acid, $HO_2C(CH_2)_nCO_2H$, where n is an integer from 1 through about 8. Examples of such alkane dicarboxylic acids include malonic acid, succinic acid, adipic acid, glutaric acid, pimelic acid, subaric acid, azelaic acid, and sebacic acid, with some preference being expressed for succinic, glutaric, and adipic acids. Other acids which may be employed, although not necessarily with equivalent results include phthalic acids, ring-substituted phthalic acids, and the hexahydro counterpart of phthalic and ring-substituted phthalic acids. By phthalic acids are included phthalic acid, terephthalic acid, and isophthalic acid. The aromatic ring in phthalic acid also may bear inert substituents, such as alkyl groups containing from 1 to 10 carbon atoms, alkoxy groups containing 1 to 10 carbon atoms, halogens, and aryl groups, especially the phenyl groups. The acid halide used is usually the chloride, in part because it is most conveniently available. However, acid bromides, fluorides, and to a lesser extent, the iodides may be used although not necessarily with results which are the same in all respects.

A third class of polyfunctional agents suitable for use in this invention consists of polybenzylic halides. What is meant by this are structures having at least two $-CH_2X$ groups attached to an aromatic ring, where X is a halogen. The simplest member of this group, using chlorine as a representative halogen, is di(chloromethyl)benzene, commonly known as xylyl chloride. Chlorine is probably the most widely used halogen, although bromine and, to a lesser extent, iodine and fluorine also may be utilized in the practice of this invention.

Still another class of crosslinking agents which may be used in the practice of this invention are divinylsulfones of the formula $(R_1CH=CR_2)_2SO_2$. The group $R_1$ may be hydrogen or an alkyl group containing from 1 through about 10 carbon atoms. $R_2$ may be hydrogen or an alkyl group containing up to about 6 carbon atoms. It is desirable that at least one of $R_1$, $R_2$, be hydrogen and the most preferred species is the parent divinylsulfone itself, that is, $R_1=R_2=H$. Where either R group is an alkyl group an unbranched alkyl group is most preferred so that reaction between the sulfone and cyclodextrin occurs rapidly and with a minimum of steric hindrance.

Yet another class of crosslinking agents for this invention consists of beta-halohydrins of the formula

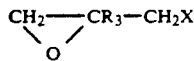

where X is a halogen, most commonly chlorine. $R_3$ may be hydrogen or an alkyl group containing from 1 up through about 6 carbon atoms. In the most preferred case $R_3$ is hydrogen, but where it is an alkyl group then an unbranched alkyl group is preferred for the same reasons as given with the divinylsulfones.

Crosslinking the cyclodextrin occurs by homogeneous reaction of the polyfunctional agent with a cyclodextrin in a suitable solvent. The cyclodextrins which can be used include alpha-, beta-, or gamma-cyclodextrin. Modified cyclodextrins also may be used, but not necessarily with equivalent results. Because of their limited solubility in most nonaqueous organic solvents, the cyclodextrin is dissolved in a dipolar aprotic solvent such as pyridine, dimethylformamide, dimethylsulfoxide, N-methylpyrrolidone, hexamethylphosphoramide, and dimethylacetamide, with the use of pyridine, dimethylformamide, and, to a lesser extent, dimethylsulfoxide highly recommended. The cyclodextrin is reacted with the crosslinking agent in an amount effective to afford a crosslinked cyclodextrin resin with the solubility characteristics previously given. The reaction conditions depend upon the reactivity of the crosslinking agent and can be readily determined by simple experimentation. For example, using polyisocyanates the reaction typically is carried out at a temperature in the range of 130°-140° C. for a time between 20 and 30 minutes, but reaction conditions are not critical and can be varied within wide limits.

As commented on above, the crosslinked cyclodextrin is used in that window of molar proportion which gives a product insoluble in water but remaining soluble in the dipolar aprotic organic solvent used for the reaction. When the reaction is complete the resin is precipitated most simply by the addition of water to the cooled reaction mixture. Other materials which can be used as precipitants, although not necessarily with equivalent results, include low molecular weight alcohols up through about hexanol, aliphatic ketones containing up to about 6 carbon atoms, and aromatics such as benzene, toluene, and so forth. However, in some of these cases the solid which precipitates may have the solvent included within the cyclodextrin cavity, and precipitation of the inclusion product may not be desirable.

The crosslinked cyclodextrin as obtained above may then be dried and conveniently stored as a powder. Although the reaction product mixture can be used directly to coat substrates, it is far more convenient to prepare and isolate the solid resin and store it as a powder until used. For use in coating the substrate the powder is then redissolved in the same class of solvents as is used in its preparation, i.e., dipolar aprotic solvents. Thus, pyridine and dimethylformamide, and to a lesser extent dimethylsulfoxide, are preferred solvents but n-methylpyrrolidone, hexamethylphosphoramide, and dimethylacetamide also may be used. Normally solutions are prepared containing at least 0.1 weight percent resin, but most often contain from about 0.5 to about 5 weight percent of the cyclodextrin resin.

The substrate may be spray coated, dip coated, or coated by any other convenient method. What needs to be done is to contact the solution of the cyclodextrin resin with the substrate. The wetted substrate is then allowed to drip dry in order to remove excess solution, and solvent is subsequently removed from the wetted substrate as by evaporation. Generally the coating of the cyclodextrin resin will be from about 0.1 to about 10.0 weight percent of the final dried material. This range is not a limitation of the method, but instead represents practical limits. If a substrate is coated with less than about 0.1% of the resin there is too little cyclodextrin present for use in typical separation or purification processes, that is, the coated substrate will have too low of a capacity. On the other hand, if the coating is greater than about 10 weight percent then the film of cyclodextrin resin becomes too thick and its efficiency is reduced. However, it needs to be reemphasized that the percentage range expressed merely reflects practical considerations rather than any limitations inherent in the method itself. In most applications a coating in the range from about 3 to about 8 weight percent is most desirable.

The lightly crosslinked resins of our invention share the property of behaving very much like the native cyclodextrin from which they are prepared with respect to their inclusion complex-forming properties. Thus, the ability of our crosslinked cyclodextrins to entrap a given material is very similar to that of the native cyclodextrin and is an important property in many applications.

The following examples are illustrative of my invention and do not limit it in any way. The use of beta-cyclodextrin and particular polyfunctional agents in these examples are only representative of the cyclodextrins and polyfunctional agents which can be successfully employed in the practice of this invention.

EXAMPLE I

Synthesis of Toluene Diisocyanate Beta-cyclodextrin Paint

A series of crosslinked beta-cyclodextrin oligomers were synthesized in which the ratio of crosslinking agent to cyclodextrin was varied and the physical properties of each oligomer were measured. A well dried 1.0 gram sample of beta-cyclodextrin (BCD) was dissolved in 5 mL of previously dried dimethylformamide (DMF) and heated almost to the boiling point. To a series of these identically prepared reaction vessels was added different amounts of toluene diisocyanate (TDI) 80/20 mixture of 2,4-/2,6-isomers. This reaction was continued for twenty minutes with mixing after which the reaction mixture was poured into ice water and the products were separated by filtration. The precipitated material was washed several times in acetone to remove any residual DMF included within the cyclodextrin. The resulting solid was finely ground and dried and its physical characteristics (pyridine solubility) and binding ability were measured.

The ability of crosslinked cyclodextrins to form inclusion complexes with guest molecules was measured by the ability of the powdered cyclodextrin to remove phenol from an aqueous solution. In this standard test a 0.1 g sample of the cyclodextrin powder was contacted with a stock solution containing 200 ppm phenol. This solution was allowed to come to equilibrium for several hours with or without shaking. A sample of the supernatant along with a sample of the stock solution was analyzed for its phenol content and the percent phenol removed per 0.1 g resin was calculated. These results are included in Table 1.

TABLE 1

| Selected Properties of TDI-BCD Oligomers | | | |
|---|---|---|---|
| Ratio TDI/BCD | Form Before Water Addition | Pyridine Solubility | % Phenol Removed |
| 1.92 | soluble | soluble | 94% |
| 2.55 | soft gel | insoluble | 94% |
| 3.19 | soft gel | insoluble | 92% |
| 3.84 | harder gel | insoluble | 90% |

These data clearly show that ratios of TDI/BCD less than 2.55 are needed to get the proper differential solubility, and also demonstrate that all oligomers are quite effective in removing phenol from solution.

EXAMPLE II

Large Preparation of BCD Paint (10 g)

In this preparation 10 g of very dry beta-cyclodextrin was dissolved in 55 mL of dry DMF to which was added 2.2 mL of fresh TDI (TDI/BCD mole ratio of 1.41). Following a procedure and workup analogous to that in Example I, 7.45 g of product was recovered (61% yield). The product showed good phenol removal capacity of 84.8%, was very soluble in pyridine and insoluble in water.

EXAMPLE III

Deposition of BCD Paint on Various Surfaces

This series of experiments demonstrate that a variety of complex surfaces could be effectively coated. A 5.0% (w/v) solution of BCD "paint" (see Example II) in pyridine was made up. A variety of materials, including aluminum foil, porous alumina, and steel wool, were coated with this solution. In each case approximately one gram of the material was dipped into 10 mL of the "paint" solution and left there for a few minutes. After this time the material was removed and the excess liquid drained off. The solvent was allowed to thoroughly evaporate leaving behind a thin film of CD polymer. This material was dried and analyzed for total combustible organic material by determining the loss on ignition.

TABLE 2

| Coating of Various Surfaces by TDI-Crosslinked BCD | | |
|---|---|---|
| Material | Depositing Solution Concentration | CD Loading (wt %) |
| Aluminum Foil | 5% | 0.38% |
| Alumina | 5% | 9.8% |
| Steel Wood | 5% | 0.19% |

EXAMPLE IV

Coating of Thin Layer Chromatography Plates

A possible application for a crosslinked cyclodextrin coating is in the area of thin layer chromatography with a ceramic or paper solid phase. In this example either a commercially available silica supported on a glass plate or a piece of commercially available paper was dip coated with a dilute solution of BCD "paint". The material was quickly immersed in a 5% (w/v) solution of the TDI-crosslinked cyclodextrin, the excess was drained, and the solvent was allowed to completely evaporate. The three isomers of nitroaniline were spotted onto the plates and using a mobile phase of methanol/water (50/50) a separation was effected similar to what is reported in the literature when pure cyclodextrin resins are used for this separation. Other multi-component ink dyes were tested, some of which showed clearly different retention patterns compared to the control plates.

EXAMPLE V

Stability of the Coating

A stability test of the TDI-crosslinked BCD coating on alumina was undertaken. In this experiment a coating was formed and then it was subsequently washed with the depositing solvent, and the coating's integrity remeasured.

Experimentally a 1.5 g sample of a high surface area gamma alumina 60/80 mesh was allowed to come in contact for one hour with 10 mL of a 5% (w/v) of BCD "paint" (see Example II) in pyridine. After this time the alumina was filtered off and the pyridine was allowed to evaporate, leaving a thin film of crosslinked cyclodextrin on the alumina surface. This material was then measured for its ability to remove phenol, as a measure of the cyclodextrin loading. After this the support was subjected to a lengthy washing step with pyridine in an attempt to remove the deposited film. After one hour of pyridine washing at room temperature the material was dried and tested for its ability to remove phenol. Finally this material was subjected to a second coating of TDI-crosslinked BCD identical to the first procedure and its capacity was measured with results tabulated below.

TABLE 3

Solvent Resistance of TDI-Crosslinked BCD Coating

| Material | % Phenol Removal |
| --- | --- |
| Uncoated Alumina | 2.1% |
| Alumina (first coating) | 18.4% |
| Alumina after pyridine stripping | 21.6% |
| Alumina (second coating) | 32.4% |

The data show the coating is very stable and resistant to leach even by the solvent which was used to deposit the film from. Obviously the binding of the film is very strong.

EXAMPLE VI

Chemical Resistance of the Cyclodextrin Film

A series of experiments were undertaken to determine the chemical stability of the film in a variety of environments, aqueous oxidizing and acid. A film of TDI-crosslinked BCD was coated onto an alumina substrate according to the previous procedure and its capacity to remove phenol was measured. This material was then subjected to a variety of washing steps including, 0.1M HCL in 40% ethanol, 1% NaClO, and a pyridine solution. All stripping was carried out with 0.7 g of support and 30 mL of the stripping agent kept at 45° C. for 2 hours. After this time the material was removed and washed and dried and its capacity measured.

TABLE 4

Chemical Resistance of TDI-Crosslinked BCD Coating

| Material | % Phenol Removal |
| --- | --- |
| Uncoated Alumina | 1.2% |
| Alumina (first coating) | 32.0% |
| Alumina after pyridine stripping | 31% |
| Alumina after HCL/Ethanol stripping | 30% |
| Alumina after NaClO stripping | 30% |

The film appears to be quite stable to aqueous chemically reactive elements. Therefore, this film is quite stable and useful for various applications.

EXAMPLE VII

Synthesis of Other TDI-Crosslinked Cyclodextrins

A dried 1.0 g sample of alpha-cyclodextrin dissolved in 5 mL of dried DMF may be heated to about 100° C. and reacted with 1.5 molar proportions of TDI. The reaction mixture may be maintained at elevated temperature for 10-30 minutes, then cooled and poured into iced water. Solids may be collected by filtration to afford TDI-crosslinked alpha-cyclodextrin. The TDI-crosslinked gamma-cyclodextrin may be prepared in a similar manner.

EXAMPLE VIII

Preparation of Other Polyisocyanate-Crosslinked Cyclodextrin Paint: Determination of the Window for MDI To a solution of 1.0 g of previously dried beta-cyclodextrin in previously dried dimethylformamide maintained at 120°-140° C. was added a solution of varying amounts MDI in DMF. The reaction was heated for 10 minutes, a time determined to be sufficient for gel formation if any were to occur. Table 5 summarizes the pertinent observations.

TABLE 5

Properties of MDI-Crosslinked BCD

| Mole Ratio MDI/BCD | Product Solubility in Reaction Mixture | Pyridine Solubility | Water Solubility |
| --- | --- | --- | --- |
| .45 | Soluble (no gel) | Soluble | Insoluble |
| .907 | Soluble (no gel) | Soluble | Insoluble |
| 1.35 | gel | Insol. | Insoluble |
| 1.81 | gel | Insol. | Insoluble |
| 2.26 | gel | Insol. | Insoluble |
| 2.71 | gel | Insol. | Insoluble |
| 4.08 | gel | Insol. | Insoluble |

These data clearly show that gel formation corresponds to resin insolubility, and that even at low molar proportions of MDI relative to BCD the resin is water insoluble. Hence an upper limit of the molar proportions of MDI to prepare a resin usable in the practice of this invention is something under 1.35.

EXAMPLE IX

Other Crosslinked Cyclodextrins as "Paint"

To a solution of beta-cyclodextrin in dimethylformamide (18 weight percent) was added from 1.5 to 4 molar proportions of a crosslinking agent at 25° C. After a reaction time of 0.5 to 1.0 hours the syrupy reaction mixture was added to dried gamma-alumina in an amount calculated to afford the desired loading. Additional DMF was added to give a thick suspension and the mixture was stirred at room temperature for at least two hours. Solvent was evaporated at 110° C., and the resulting coated alumina was washed twice with acetone (200 mL portions), 4-5 times with 200 mL portions of water, and twice with 200 mL portions of ethanol. The washed material was dried at 110° C. for 1-2 hours, sieved, and tested for phenol removal as described above. Results are summarized in Table 6, where "molar proportion" refers to the molar ratio of crosslinking agent to beta-cyclodextrin.

TABLE 6

Crosslinked Cyclodextrin Films on Gamma Alumina

| Crosslinking Agent | Molar Proportion | Resin Offered Percent | Resin Loaded Percent | % Phenol Removal |
| --- | --- | --- | --- | --- |
| Glutaryl | 3.5 | 2 | | 8.6 |
| Dichloride | 3.5 | 5 | | 18.3 |
| | 3.5 | 10 | 7.82 | 39.4 |
| | 3.5 | 20 | | 51.4 |
| Divinyl | 1.5 | 5 | | 1.7 |
| Sulfone | 1.5 | 10 | 2.6 | 8.8 |
| | 1.5 | 20 | | 17.4 |

What is claimed is:

1. A method of forming a film of a cyclodextrin resin on at least one surface of a solid phase substrate comprising contacting said surface of said solid phase with a solution in an dipolar aprotic organic solvent of a crosslinked cyclodextrin, said crosslinked cyclodextrin being a complexing agent with the complexing properties of the non-crosslinked cyclodextrin, being the reaction product of a cyclodextrin and a polyfunctional reagent selected from the group consisting of activated polycarboxylic acids, polybenzylic halides, divinylsulfones, and $\beta$-halohydrins and having a solubility in water at 25° C. of less than about 200 ppm and having a solubility in a dipolar aprotic organic solvent at 25° C. of at least 0.1 weight percent, removing the excess of said solution from said surface, and evaporating the dipolar aprotic organic solvent to leave a film of the crosslinked cyclodextrin on said surface.

2. The method of claim 1 where the solid phase substrate is selected from the group consisting of ceramics, glass, plastics, metals, fabrics, and cellulosic products.

3. The method of claim 2 where the solid phase substrate is a ceramic selected from the group consisting of refractory inorganic oxides.

4. The method of claim 3 where the refractory inorganic oxide is selected from the group consisting of alumina, titania, silica, magnesia, boria, thoria, zirconia, and combinations thereof.

5. The method of claim 4 where the refractory inorganic oxide is alumina or silica.

6. The method of claim 1 where the dicarboxylic acid is selected from the group consisting of linear alkane dicarboxylic acids of the formula $HO_2C(CH_2)_nCO_2H$, where n is an integer from 1 to about 8, the phthalic acids, and the hexahydrophthalic acids.

7. The method of claim 1 where the divinylsulfone has the formula $(R_1CH=CR_2)_2SO_2$, where $R_1$ is selected from the group consisting of hydrogen and alkyl groups containing from 1 to about 10 carbon atoms, and $R_2$ is selected from the group consisting of hydrogen and alkyl groups containing from 1 through about 6 carbon atoms.

8. The method of claim 7 where $R_1$ and $R_2$ each are hydrogen.

9. The method of claim 1 where the polyfunctional agent is selected from the group of beta-halohydrins having the formula

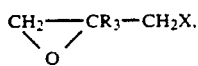

where X is a halogen and $R_3$ is hydrogen or an alkyl group containing from 1 through about 6 carbon atoms.

10. The method of claim 1 further characterized in that the film of crosslinked cyclodextrin contains a guest molecule as an inclusion complex.

11. A coated solid comprising a solid phase substrate having a film on at least one of its surfaces amounting to from about 0.1 to about 10 weight percent of a crosslinked cyclodextrin, said crosslinked cyclodextrin being a complexing agent with the complexing properties of the non-crosslinked cyclodextrin, being the reaction product of a cyclodextrin and a polyfunctional reagent selected from the group consisting of activated polycarboxylic acids, polybenzylic halides, divinylsulfones, and $\beta$-halohydrins and having a solubility in water at 25° C. of less than about 200 ppm and having a solubility in a dipolar aprotic organic solvent at 25° C. of at least 0.1 weight percent.

12. The coated solid of claim 11 where the solid phase substrate is selected from the group consisting of ceramics, glass, plastics, metals, fabrics, and cellulosic products.

13. The coated solid of claim 12 where the substrate is a ceramic selected from the group consisting of refractory inorganic oxides.

14. The coated solid of claim 13 where the refractory inorganic oxide is selected from the group consisting of alumina, titania, silica, magnesia, boria, thoria, zirconia, and combinations thereof.

15. The coated solid of claim 14 where the refractory inorganic oxide is alumina or silica.

16. The coated solid of claim 11 where the dicarboxylic acid is selected from the group consisting of linear alkane dicarboxylic acids of the formula $HO_2C(CH_2)_nCO_2H$, where n is an integer from 1 to about 8, the phthalic acids, and the hexahydrophthalic acids.

17. The coated solid of claim 11 where the divinylsulfone has the formula $(R_1CH=CR_2)_2SO_2$, where $R_1$ is selected from the group consisting of hydrogen and alkyl groups containing from 1 to about 10 carbon atoms, and $R_2$ is selected from the group consisting of hydrogen and alkyl groups containing from 1 through about 6 carbon atoms.

18. The coated solid of claim 17 where $R_1$ and $R_2$ each are hydrogen.

19. The coated solid of claim 12 where the polyfunctional agent is selected from the group of beta-halohydrins having the formula

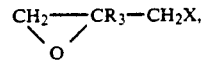

where X is a halogen and $R_3$ is hydrogen or an alkyl group containing from 1 through about 6 carbon atoms.

20. The coated solid of claim 11 further characterized in that the film of crosslinked cyclodextrin contains a guest molecule as an inclusion complex.